8810X
J. Warren. Sheet 1. 2 Sheets
Printing Press.
No. Patented May 2. 1835.
NO PRINTED COPY OF SPECIFICATION IN OFFICE.
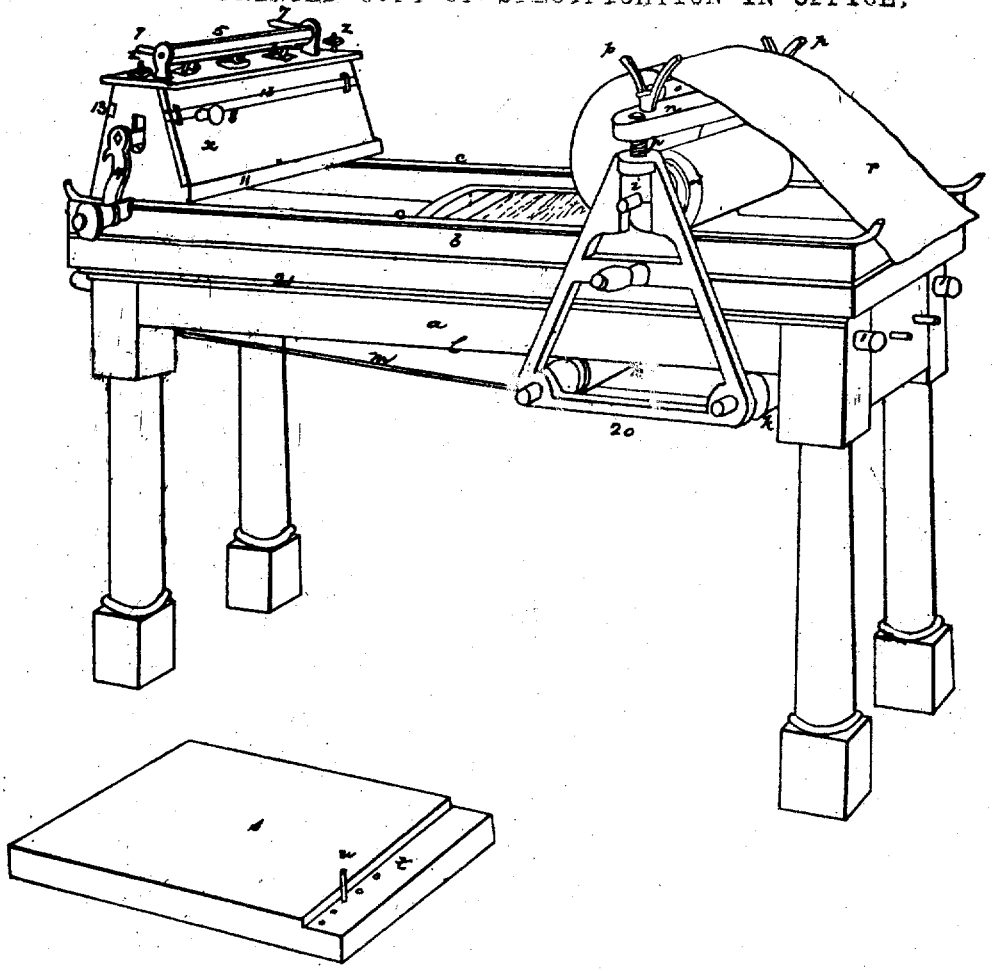

8810X
J. Warren. Sheet 2. 2 Sheets.
Printing Press.
No. Patented May 2. 1835.
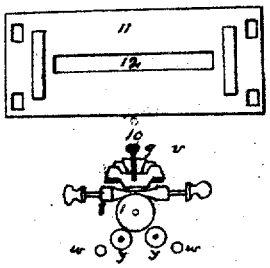
NO PRINTED COPY OF SPECIFICATION IN OFFICE.
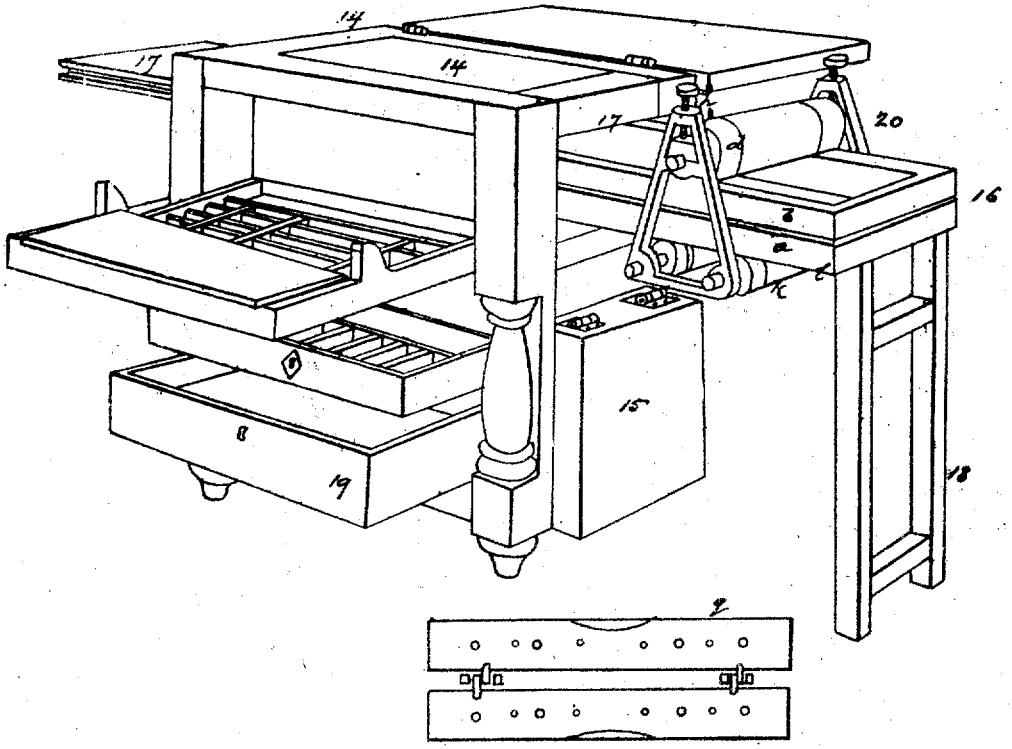

Josiah Warren of Warwick Ohio

8810X Letters Patent

The Schedule referred to in these Letters Patent and making part of the same
containing a description in the words of the said Josiah Warren himself
of his improvements in an apparatus for Printing called Warren's Simpli-
fied Printing apparatus.

Be it known that I Josiah Warren of Warwick Township Tuscarawas
County and State of Ohio, have made an improvement in the useful art
being an apparatus for printing called Warren's Simplified Printing
apparatus, which is described as follows. Parts. A frame or case
which supports or contains the different parts. The platform or table on
which the types are placed. Three Press rollers connected together at their
ends in a triangular relation to each other. one to pass over the types
called the impression Roller. supported at each end by a lateral rail
way and two counter pressure rollers. working up against similar rail
ways upon which the type table rests. clamps and guides for making re
gister; Inking apparatus, consisting of a chest or box containing the ink
reservoir, distributing rollers, ink rollers ~~with~~ hooks in which they are
suspended. Said hooks regulating the height of the ink rollers by nuts
and screws. a trough for holding water to keep the rollers moist. The
frame (a) in the annexed drawing is made rectangular. of any convenient
size adapted to any kind of work. for which it is intended. On the upper
side is a plain horizontal surface made of iron, stone, wood. or any other
suitable material. and it may be covered with a hard coating of Shell Lac
and sand. or Shell Lac and iron filings. or when made of wood the under
or first part of the coating may consist of glue and sand. and the upper
or finishing coat of Shell Lac and iron filings. The form of types is placed
upon this surface. above this table and resting on the sides thereof is another
frame (b) called the upper railways between which and the table is put
some elastic substance. such as hat cloth. metal springs or gum elas
tic. for keeping the press rollers always at the desired heighth. being

38.

8810X those a thick will allow the impression Roller to approach near enough to
the types to give the impression, but never falling below the level of their sur
face: The rail ways may be made of wood alone, or wood with metalic
rods (c) fastened on there upper sides. the impression roller having a
groove at each end in which the iron rods work, and upon which the im
pression roller moves backwards and forwards; The impression roller (d)
is made of wood ~~and~~ or metal turned true, and of any convenient diameter, from
2 1/2 to five inches being covered with cloth, or other elastic substance, the
cloth must be closed by a "fine drawn seam" to preserve an equal surface
The cloth being covered lastly with paper, to be changed when desired.
The pressure upon the types is regulated by the screws (h) acting upon
the metalic boxes (i) over the gudgeons of the impression Roller being
counteracted by the two under rollers (k) pressing up against the un-
der surface of the under railways (l.) said Rail ways may be of wood, or
metal or both. the under or counter pressure rollers may be made of wood
with or without metalic ends. having grooves or flanges to keep them in
track. The three combined rollers are kept square or at right angles
with the type table by means of cords (m) or racks & pinions on the under
rollers. The under rollers are placed at a suitable distance apart so that
when the combination of Rollers is moved the motion will be steady and
the pressure uniform. To keep the paper smooth and to prevent its run-
ning before the impression Roller. a bar (n) is placed over the impres-
sion roller, over which the paper is thrown. When this friction is not suf
ficient to prevent the paper from wrinkling. the roller (o) is thrown on
to the Y° (p) to add to the friction by the whole or part of its weight.
this being modified by the screws of the Y° together with the elastic cloth-
ing of said roller; or the paper is thrown over the roller. when the least
friction is desired. The registering clamps (q) consist of two principal parts
hinged together and moveable at pleasure, having points fixed at conveni-
ent distances on one side and corresponding holes in the other. There
are other points in the furniture which is locked up with the form
and placed at any convenient distance from the types and correspond-
ing holes in said clamps. fitting upon the points in the furniture
which

8810X bring the paper (W) when clamped in the right position to be printed.
said furniture having also slots to guide the hinges of the clamping into
place. S is a square board having a rabbet (T) on one end at right an
gles with its sides. The clamping being placed open against the shoulder of
the rabbet, receive one end of the paper when it is laid on the board.
the edge of the sheet corresponding with the edge of the board, the clamping then
being shut, clasp the paper in a proper position to be printed. The point
in the clamping perforating the paper, by which holes the second side of
the sheet is registered. The clamping sheets of different widths a
moveable pin (U) is used against which the end of the clamping is place
so as to make the paper when clamped, correspond with the form.
The inking apparatus (V) may be double or single one or two to each
press. The double roller is constructed as long as the type table is a
resting at the ends upon friction rollers (W) which are grooved to
run upon the rods of the Railways. It consists of a box (X) or a chest
containing two ink rollers (Y) suspended by hooks, and their height
regulated by the screws and nuts (Z) at the top of said hooks. above
the ink rollers is a distributing roller (1) which receives ink from
the cloth (2) in the bottom of the ink reservoir (3) and is then drop
ped down upon the ink rollers and turned by a crank (4) having
also a lateral motion, which motions distribute the ink upon the
ink rollers, which being done, the distributer is lifted from the ink
rollers and suspended between them and the ink reservoir by means of tur
ning the bar (5) so that the short pins (6) stand vertically. When more
ink is taken from the reservoir the bar is turned further round and the long pins (7) force
the distributer against the reservoir and keep it there if desired.
In printing a small form the little transverse roller (8) is worked upon the
distributer to carry the ink from the ends to the desired place. Above the distrib
uter is the ink reservoir having a top (9) air tight with a hole stopped with
a screw (10) The object of the air tight top is to prevent the ink from fallin
when not in use, and that of the screw stopper is to let air in when the ink
is required. The bottom of the inker (11) is moveable at pleasure having
attached to it a trough (12) made of lead or other metal not subject to corro
sion.

388.

8810X by [illegible]. [illegible] [illegible] motion [illegible] and the box setting over it keeping the roller
moist. In the sides of the box there are slots (13) through which the handles of
the transverse roller (3) protrude. These being stopped with slides render the
box, [illegible] not at work impervious to dust and keep the moisture within the
box. The simple [illegible] but one ink roller, the ink being taken from the
reservoir by the little transverse roller which is then dropped down upon the
ink roller, and worked from end to end of it, giving the handles of the transverse
roller an oblique motion by which the ink roller is turned. The object of this in-
vention is to simplify and cheapen the printing press so as to adapt it to the
condition and capacity of private citizens. It may however be used to advan-
tage by professional printers. When used by private citizens, the Press, ink-
ing apparatus, type cases and all the implements necessary for printing are en-
closed (if desired) in one piece of furniture such as a secretary (14), dining table,
chest of drawers, or counting house desk. When combined with the secretary
or similar piece of furniture the ends are closed with falling doors (15), the type
table (16) and cases (17) sliding in or out at either end. The type table when
drawn out is supported at the outer end by a moveable standard (18), the other
end remaining in or resting on the piece of furniture to which stops are affixed
to stop it at the proper place. But when shut up the roller, inking appara-
tus &c may be deposited in one of the drawers (19). When the types are to be han-
dled by those who are unaccustomed to their use I propose that the nicks in
the spaces, quadrates, brackets, inverted commas, &c should be made to correspond with those
in the letters so as to admit a thread around them confining each composing
stick full together, so that they can be handled while dry and clean without
displacing them and without that tact and skill which result only from long
experience. Mode of manufacture; The type table when made of iron or
stone, may be covered with a hard coating of Shell Lac and iron turnings
and filings or Shell Lac and sand thus having the bed fastened permanent-
ly upon the under railways which are finished ready for printing put
a thick coat of Shell Lac dissolved in good alcohol over the surface
of the bed, then throw on fine iron turnings and when the Shell Lac
has set brush off the loose turnings and what sticks constitutes a kind
of frame work for the coat. Put on the combination of Press rollers (20)

making the under rollers (R) bear up against the under railways, then
bringing the top roller so that when worked back and forth it will roll down
the coating to a surface corresponding exactly to the surface of the top roller.
and the lower railways, then coats and this process is to be repeated till the
top roller touches at all points. Then another coat of shell lac is spread
on with a straight edge. and iron filings or dry sand is immediately sif-
ted over the surface. when this becomes dry it is scoured down with sand
stone. and the dust made by scouring is used in the after coats instead
of sand. or mixed with iron filings or fine borings. and this process of
coating and scouring is repeated till the surface is sufficiently even.
then the rollers are put on the railways at top and bottom as if for print-
ing and a block of wood is cut out so as to fit the diameter of the impression
roller. and slipped on it and reaching down to the surface to be scoured,
adjust both ends of the impression roller (d) precisely at the same distance
from the under surface of the under railway. Then throw dry sand upon
the surface and move the rollers back and forth, and the block alternately
along the whole width of the bed. thus grinding the surface to correspond
at all points with the impression roller, using the surface of the impression
roller as a governor to the grinding block. when the bed is made of
wood there are mouldings (21) all around projecting above the wood foun-
dation. take a gage or scribing tool with two bearing points to answer to the
two under rollers. place these bearing points up against the under railway and
and scribe the upper surface of said mouldings down to the desired height, so
that using the scribed edge as a guide for the thickness of the coating it will
be from an eighth to a quarter of an inch thick. Then take warm glue and
sand about the consistence of cream. or as thick as it will spread. and
having the wooden surface previously heated at or above the same tempera-
ture. spread on the coat of glue and sand. with a straight edge or spread-
ing Box. using the scribed edges of the projecting moulding as gages or rest-
ing points for the straight edge or box and before the glue cools sift as much
fine sand into its surface as it will receive. When dry brush off the loose
sand and proceed to finish with coats of Shell Lac and iron filings as
before directed. To avoid the necessity of heating the wooden bed (which is
done to prevent blistering the glue and sand may be put on in two coats. the blister-
ing of the first being then of no consequence; in which case dry sand is not
sifted onto the surface of the first coat. in this last case the straight edge
or box is notched at the ends where it bears upon the mouldings. so that
the first coat shall constitute but about half of the whole thickness of the cov-
ering. the next coat is put on without notches in the spreading tool
which makes the surface flush with the top of the mouldings. The top sur-
faces of said mouldings are used throughout the process of spreading the
after coats of dissolved Shell Lac. the object of which is that the surface
of the type can be easily made to correspond with the surface of the un-
der railways. upon which correspondence the perfection of the impression
depends. The roller moulds are made by dipping a polished mandrile
into melted metal such as lead and antimony equal parts, or pewter.
a coat immediately chills around the mandrill, which is then stretched
with gentle blows of a hammer, and being thus disengaged the mandrile
is forced out by placing a wooden plug against the end and striking a
heavy blow with a large hammer. Adding a tin bottom to this tube it
is ready for use after putting to it the usual top. the troughs in the ink
boxes are made by dipping a mandrill part way into the melted metal
in a horizontal position. The coat that chills forms the trough complete.
If the trough be so long as to settle in the middle upon drawing out of the
metal the middle is sustained by a hook in the hand of a second person.
<u>Mode of Operation</u>. The types being placed on the table or platform
locked up in a chase in the usual manner, with the regulating pieces of fur-
niture placed at a proper distance from the form of types. The rollers of the
inking apparatus having been supplied with ink are passed over the form
by moving the apparatus back and forward, its ends resting on the railways.
The sheet (r) to be printed is placed upon the registering board (S) its up-
per edge corresponding with the upper edge of the board. and the clamps are
placed upon the notched end (t) with their end against the moveable
pin (u). so as when shut to clasp the paper in the right place the clamps
are then shut. clasping one end of the paper and by means of the points
making holes for registering. the ~~second~~ side of the sheet. The sheet is then

[illegible] by the clamps to the [illegible]. the lever [illegible] thrown over the friction bar
(n) or roller (e) and the clamps the [illegible] to their place being guided by
slots and pins. The combination of rollers (2e) is then moved forward
and gives the impression. For a further illustration of these improve
ments, I refer to the annexed drawings and to the models deposited
in the Patent office. The invention here claimed and desired to be secu
red by Letters Patent is the above described apparatus for inking, reg
istering or placing the sheet and giving the impression in printing. Partic
ularly the arrangement and combination of the parts and their applicatio
to commodious or ornamental articles of furniture Witnesses
William P Elliot
James Bayliss Josiah Warren (Drawing)

( [illegible] Model)